H. E. RICHTER.
CREAM PROTECTOR.
APPLICATION FILED JAN. 24, 1916.
1,230,785.
Patented June 19, 1917.
2 SHEETS—SHEET 1.
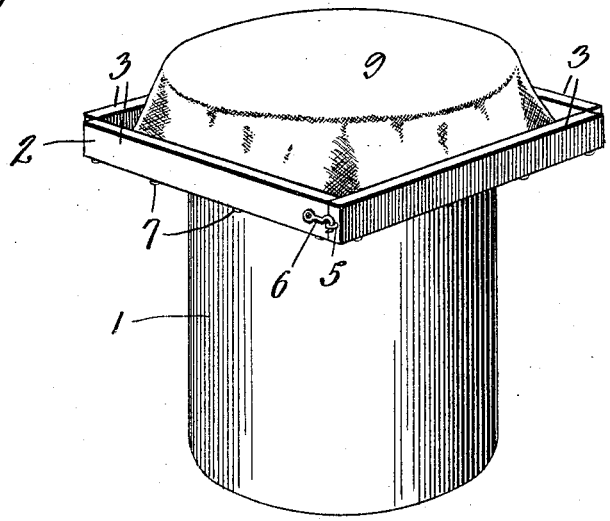
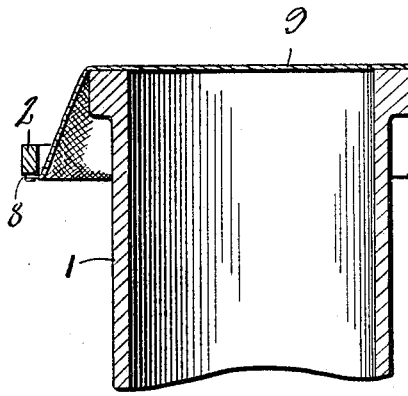
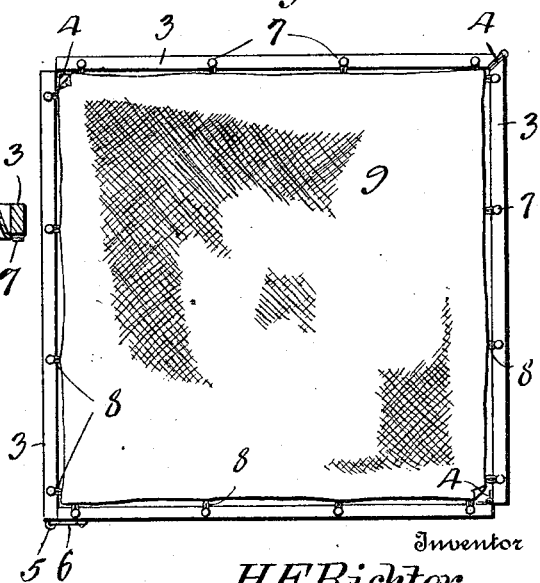
Witness
E. C. Andeeser Jr.
Inventor
H. E. Richter,
By Victor J. Evans
Attorney H. E. RICHTER.
CREAM PROTECTOR.
APPLICATION FILED JAN. 24, 1916.
1,230,785.
Patented June 19, 1917.
2 SHEETS—SHEET 2.
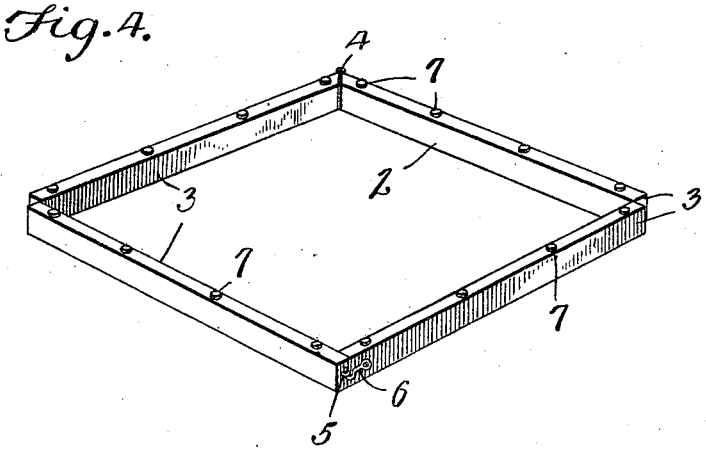
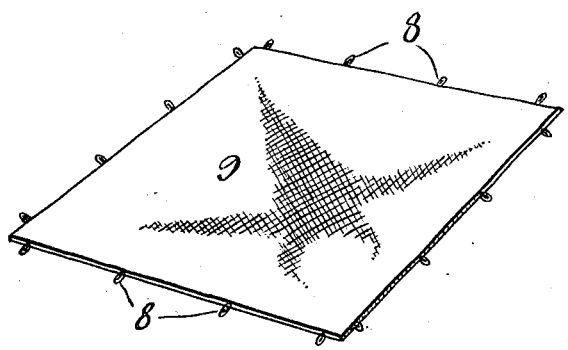
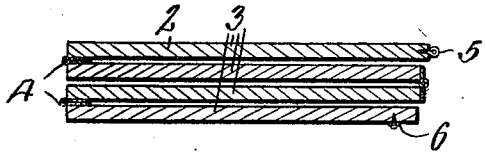
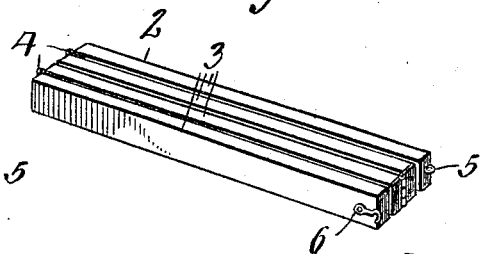
Inventor
H. E. Richter,
Witnesses
By Victor J. Evans
Attorney

UNITED STATES PATENT OFFICE.

HENRY E. RICHTER, OF SUMMERFIELD, KANSAS.

CREAM-PROTECTOR.

1,230,785.  Specification of Letters Patent.  Patented June 19, 1917.

Application filed January 24, 1916. Serial No. 74,020.

*To all whom it may concern:*

Be it known that I, HENRY E. RICHTER, a citizen of the United States, residing at Summerfield, in the county of Marshall and State of Kansas, have invented new and useful Improvements in Cream-Protectors, of which the following is a specification.

The present invention relates to protective devices for cream and milk containing receptacles, and the object of the invention is to provide a collapsible frame having removably connected therewith a cover of some pervious material, such as a strip of linen or other fabric which when in its set up position is adapted to be arranged over the mouth of the receptacle to cover the same, the weight of the frame forcing the fabric material into tight engagement with the said mouth of the receptacle to prevent the entrance of insects, dirt, etc., thereto, but at the same time permitting a certain and desired amount of air to enter the receptacle to aerate the butter-fat within the crock, and also whereby the device may be easily and quickly folded when not in use, into a compact bundle, so that the same will occupy small space for storage.

With the above and other objects in view, the improvement resides in the construction and arrangement of parts set forth in the following specification and falling within the scope of the appended claims.

In the drawings:

Figure 1 is a view illustrating the application of the improvement,

Fig. 2 is a transverse sectional view through the same,

Fig. 3 is a bottom plan view of the improvement,

Fig. 4 is a perspective view of the same in its set up position and looking toward the bottom thereof, Fig. 5 is a similar view of the fabric member connected with the frame, Fig. 6 is a perspective view showing the device folded, and Fig. 7 is a longitudinal sectional view through the same.

In the drawings, the numeral 1 designates an ordinary butter fat receptacle and 2 the improvement. The improvement contemplates the employment of a frame made up of a plurality of strips of any suitable material and of equal lengths and comprising four in number. These members, each of which is indicated by the numeral 3, are hingedly connected, as indicated by the numeral 4. The free ends of the terminal strips are provided one with an eye 5, and the other with a hook 6 which is adapted to be swung into engagement with the said eye. The lower edges of each of the strips comprising the frame have projecting headed members 7, and these heads are adapted to engage with eyes 8 provided upon the edges of a substantially rectangular sheet or body of fabric material such as linen or the like.

In applying the device the frame provided with the headed members is arranged over the mouth of the receptacle so as to bulge the central portion of the fabric when the same contacts with the edges of the mouth of the receptacle and whereby the weight of the frame will force the fabric therefrom into engagement with the said mouth of the receptacle thus preventing the entrance of insects or dirt to the butter-fat contained in the receptacle.

When the device is not in use the hinged elements may be swung one against the other as illustrated in Fig. 6 of the drawings, the fabric member being folded between the said members of the frame. It will be apparent that the fabric members may be readily detached from the frame for cleansing.

Having thus described the invention, what I claim is:

1. In a device of the class described, a frame comprising four strips of equal lengths, two of said strips having their ends beveled and said beveled ends adapted to abut, a hinge member connecting these ends, the two remaining strips having their ends hingedly secured interiorly one to each of the first mentioned pair of strips and one of the said last mentioned strips adapted to overlie the end of the other of said last mentioned strips, means for removably connecting the latter mentioned pair of strips, elements projecting from one of the edges of all of the strips, and a fabric sheet having its edges provided with eyes adapted to engage with the said elements whereby to removably retain the said fabric strip upon the frame.

2. In a device of the class described, a fabric sheet and a frame adapted to be removably connected with said sheet, said frame comprising strips of equal lengths, all of which being hingedly connected one with the other in a manner to permit of said strips being folded one against the other when the frame is collapsed, means for retaining the frame in its set up position, and means for detachably securing the fabric to the frame.

In testimony whereof I affix my signature in presence of two witnesses.

HENRY E. RICHTER.

Witnesses:
EMMERT BLACK,
J. A. HAMLER.

Copies of this patent may be obtained for five cents each, by addressing the "Commissioner of Patents, Washington, D. C."